United States Patent
Ho et al.

(10) Patent No.: US 10,210,455 B2
(45) Date of Patent: *Feb. 19, 2019

(54) RELATION EXTRACTION USING CO-TRAINING WITH DISTANT SUPERVISION

(71) Applicant: INTERNATIONAL BUSINESS MACHINES CORPORATION, Armonk, NY (US)

(72) Inventors: Tin Kam Ho, Millburn, NJ (US); Luis A. Lastras-Montano, Cortlandt Manor, NY (US); Sean A. Wilner, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,296

(22) Filed: Feb. 16, 2018

(65) Prior Publication Data

US 2018/0373990 A1    Dec. 27, 2018

Related U.S. Application Data

(63) Continuation of application No. 15/629,896, filed on Jun. 22, 2017.

(51) Int. Cl.
*G06F 17/00* (2006.01)
*G06N 5/02* (2006.01)
*G06F 17/27* (2006.01)

(52) U.S. Cl.
CPC ........... *G06N 5/022* (2013.01); *G06F 17/277* (2013.01); *G06F 17/2785* (2013.01)

(58) Field of Classification Search
CPC ......... G06F 17/30654; G06F 17/30864; G06F 17/2795; G06F 17/30684; G06F 17/30976; G06F 17/2247; G06F 17/248; G06F 17/274; G06F 17/2785; G06F 17/30734; G06F 17/2765; G06F 17/2705; G06F 17/30675; G06F 17/30696; G06F 17/3071; G06F 17/30719; G06F 17/30958; G10L 15/1815; G10L 15/183; G10L 15/193

See application file for complete search history.

(56) References Cited

U.S. PATENT DOCUMENTS 8,935,239 B2 * 1/2015 Mukherjee ........... G06Q 10/101
                                          707/723
8,984,398 B2 * 3/2015 Kanungo .......... G06F 17/30719
                                          707/748

(Continued)

OTHER PUBLICATIONS

IBM: List of IBM Patents or Patent Applications Treated As Related (Appendix P), Feb. 16, 2018, pp. 1-2.

(Continued)

*Primary Examiner* — Abdelali Serrou
(74) *Attorney, Agent, or Firm* — Reza Sarbakhsh

(57) ABSTRACT

Generating, updating, and using a knowledge graph. Concepts in a knowledge graph can have relations to one another. These relations may be expressed as confidence values. A training data set may be split into two portions, with the first portion used to update confidence values for existing relations between concept pairs, using the knowledge graph. These confidence values can be used, together with the second portion used to update confidence values for known phrases that express known relations. These confidence values, in turn, can be used, together with the first portion, to increase the accuracy of the original confidence scores with respect to existing relations. The process may be iteratively employed, with each iteration increasing the accuracy of confidence scores.

1 Claim, 7 Drawing Sheets

(56) References Cited

U.S. PATENT DOCUMENTS

| | | | |
|---|---|---|---|
| 9,235,806 | B2 | 1/2016 | Sweeney et al. |
| 9,292,494 | B2 | 3/2016 | Ceusters et al. |
| 9,361,365 | B2 | 6/2016 | Sweeney et al. |
| 9,904,729 | B2* | 2/2018 | Sweeney ............ G06F 17/30734 |
| 2001/0049596 | A1 | 12/2001 | Lavine et al. |
| 2005/0154690 | A1 | 7/2005 | Nitta et al. |
| 2006/0224569 | A1 | 10/2006 | DeSanto et al. |
| 2006/0224580 | A1 | 10/2006 | Quiroga et al. |
| 2006/0253431 | A1 | 11/2006 | Bobick et al. |
| 2007/0074102 | A1 | 3/2007 | Kraft et al. |
| 2007/0078814 | A1 | 4/2007 | Flowers et al. |
| 2007/0255555 | A1 | 11/2007 | Crouch et al. |
| 2008/0195587 | A1 | 8/2008 | Hussami |
| 2009/0012842 | A1 | 1/2009 | Srinivasan et al. |
| 2009/0024385 | A1* | 1/2009 | Hirsch ................. G06F 17/2705 704/9 |
| 2009/0024615 | A1* | 1/2009 | Pedro ................. G06F 17/30734 |
| 2011/0087670 | A1 | 4/2011 | Jorstad et al. |
| 2011/0119302 | A1 | 5/2011 | Gorman et al. |
| 2012/0078919 | A1 | 3/2012 | Mineno |
| 2012/0284199 | A1 | 11/2012 | Lundberg |
| 2013/0041921 | A1 | 2/2013 | Cooper et al. |
| 2013/0158982 | A1 | 6/2013 | Zechner et al. |
| 2014/0039879 | A1* | 2/2014 | Berman ................. G06F 17/277 704/9 |
| 2015/0081281 | A1* | 3/2015 | Bustelo ............... G06F 17/2735 704/10 |
| 2015/0088888 | A1 | 3/2015 | Brennan et al. |
| 2015/0186504 | A1* | 7/2015 | Gorman .............. G06F 17/2705 707/752 |
| 2015/0324349 | A1* | 11/2015 | Weiss ................ G06F 17/30654 704/9 |
| 2015/0363384 | A1* | 12/2015 | Williams ............ G06F 17/2785 704/9 |
| 2016/0062982 | A1 | 3/2016 | Wroczynski et al. |
| 2017/0032273 | A1* | 2/2017 | Ho ....................... G06N 99/005 |
| 2017/0083492 | A1 | 3/2017 | Chang et al. |
| 2017/0083547 | A1* | 3/2017 | Tonkin .............. G06F 17/30734 |
| 2017/0270095 | A1* | 9/2017 | Ichimura ............. G06F 17/2735 |
| 2018/0039909 | A1 | 2/2018 | Sadoddin et al. |
| 2018/0082122 | A1* | 3/2018 | Verdejo .............. G06K 9/00577 |
| 2018/0082183 | A1* | 3/2018 | Hertz ................ G06F 17/30675 |

OTHER PUBLICATIONS

Ho et al., Pending U.S. Appl. No. 15/629,891, filed Jun. 22, 2017, titled "Relation Extraction Using Co-Training With Distant Supervision," pp. 1-49.

Ho et al., Pending U.S. Appl. No. 15/898,284, filed Feb. 16, 2018, titled "Relation Extraction Using Co-Training With Distant Supervision", pp. 1-44.

Pujara et al., "Knowledge Graph Identification," Carnegie Mellon University, Research Showcase @ CMU, Oct. 2013, Published in Lecture Notes in Computer Science, 8218, pp. 542-557.

Xiang et al., "Bias Modeling for Distantly Supervised Relation Extraction," Research Article, Hindawi Publishing Corporation, Mathematical Problems in Engineering, vol. 2015, Article ID 969053, Accepted Aug. 11, 2015, Copyright 2015, Yang Xiang et al., pp. 1-10.

Batista et al., "Semi-Supervised Bootstrapping of Relationship Extractors with Distributional Semantics," Proceedings of the 2015 Conference on Empirical Methods in Natural Language Processing, Lisbon, Portugal, Copyright 2015 Association for Computational Linguistics, Sep. 2015, pp. 499-504.

Surdeanu et al., "Multi-instance Multi-label Learning for Relation Extraction," Proceedings of the 2012 Joint Conference on Empirical Methods in Natural Language Processing and Computational Natural Language Learning, Jeju Island, Korea, Jul. 12-14, 2012, Copyright 2012 Association for Computational Linguistics, pp. 455-465.

Augenstein, "Seed Selection for Distantly Supervised Web-Based Relation Extraction," Proceedings of the Third Workshop on Semantic Web and Information Extraction, Dublin, Ireland, Aug. 24, 2014, pp. 17-24.

Komachi et al., "Graph-based Analysis of Semantic Drift in Espresso-like Bootstrapping Algorithms," Proceedings of the 2008 Conference on Empirical Methods in Natural Language Processing, Honolulu, Oct. 2008, Copyright 2008, Association for Computational Linguistics, pp. 1011-1020.

Girju et al., "Automatic Discovery of Part-Whole Relations," Computational Linguistics Computational Linguistics 32 (1):83-135, Feb. 2006, Association for Computational Linguistics, pp. 1-43.

Takamatsu et al., "Reducing Wrong Labels in Distant Supervision for Relation Extraction," Proceedings of the 50th Annual Meeting of the Association for Computational Linguistics, vol. 1, Jul. 2012, Jeju, Republic of Korea, Jul. 8-14, 2012, Copyright 2012, Association for Computational Linguistics, pp. 721-729.

Mintz et al., "Distant supervision for relation extraction without labeled data," In Proceedings of the Joint Conference of the 47th Annual Meeting of the ACL and the 4th International Joint Conference on Natural Language Processing of the AFNLP, Aug. 2009, vol. 2, Association for Computational Linguistics, 2012, pp. 1-10.

Mell et al., "The NIST Definition of Cloud Computing," National Institute of Standards and Technology, U.S. Department of Commerce, Special Publication 800-145, Sep. 2011, pp. 1-7.

Ho et al., Pending U.S. Appl. No. 15/629,896, filed Jun. 22, 2017, titled "Relation Extraction Using Co-Training With Distant Supervision," pp. 1-48.

* cited by examiner

RELATION EXTRACTION USING CO-TRAINING WITH DISTANT SUPERVISION

BACKGROUND

Embodiments of the invention generally relate to electronic natural language processing, and more particularly, to generating, modifying, evaluating, and using knowledge graphs.

One task of interest in the natural language processing (NLP) field is to build knowledge graphs corresponding to a knowledge domain. A knowledge domain may refer to a set of interrelated concepts, where two or more concepts may have some relation to one another. Concepts may be considered elements of the knowledge domain. The knowledge domain may include subdomains that refer to specialized forms of that knowledge domain. The knowledge domain itself may be a subdomain of a more generalized domain. Knowledge graphs are data representations of such domains and subdomains. Knowledge graphs may be stored on a computing device as a data structure, and may be viewable on an input/output (I/O) device as a graph. The data structure itself may be a logical graph, and may simply be referred to as a graph.

Knowledge graphs may be structured as interconnected nodes organized in a hierarchical structure. Constructing a knowledge graph may include identifying words or lexical or syntactic features (for example, phrases) as nodes of the graph, and connecting them according to a known or discovered hierarchy. The nodes may also be connected based on known or discovered relations between them. The connections may also be referred to as edges. Generating, expanding, contracting, or otherwise modifying a knowledge graph (including its edges/connections), then, may involve identifying nodes and relations between them. Other ways of structuring a knowledge graph, such as sets of "is-a" links that define categories in the knowledge graph, and their constituent concepts, are also possible.

One way to identify relations between concepts in a domain, or nodes in a knowledge graph, is to perform relation extraction on a reference text. Approaches to relation extraction in NLP systems generally fall into four main categories: supervised, unsupervised, distantly supervised, and bootstrapped.

Supervised techniques tend to have the greatest fidelity; they can more accurately identify entity relations relative to other methods. However, the accuracy that supervised techniques provide comes at a high cost, because these techniques require lager bodies of manually annotated text; the effort of manually annotating text requires replication for each relation and each domain.

Unsupervised techniques fall at the other end of the spectrum, requiring little to no human intervention to discover relations. However, the resulting knowledge graph often includes noise, and mapping the resulting relation clusters onto human readable relations is non-trivial, and sometimes can be nearly impossible, or at least impractical. This prevents proper interpretation and merger with existing knowledge graphs.

Bootstrapping and distant supervision sit somewhere in the middle of the spectrum, requiring some known instances of entity relations, but relying heavily on large collections of unlabeled text to facilitate learning.

Therefore, it would be useful to employ a mechanism to address some or all of these concerns, as recognized and addressed by some embodiments of the invention. It should be noted that addressing these concerns may be a feature of embodiments of the invention, but is not required.

SUMMARY

Embodiments of the invention include a method, computer program product, and system, for processing textual data in a way that can be used to create, update, and evaluate a reference knowledge graph.

A method for knowledge graph processing, according to an embodiment of the invention, receives a set of natural language text and labels it. The labeling includes identifying concepts in the natural language text and extracting from the natural language text, lexical and syntactic features (for example through parsing). The method splits the natural language text into at least a first portion and a second portion, and performs a first analysis, on sentences of the first portion, the first analysis comprising a category-based initialization on identified concepts of the first portion of the natural language text, the category-based initialization yielding a first set of confidence values measuring, for a given sentence including a concept pair, a likelihood that the sentence is an instance of an existing relation of the concepts in the concept pair. The method performs a second analysis, on sentences of the second portion, the second analysis yielding a second set of confidence values measuring, for a given sentence including a concept pair, a likelihood that a phrase connecting concepts in the concept pair is an instance of an existing relation between the concepts in the concept pair, wherein the second set of confidence values is based, in part, on the first confidence values. The method performs a third analysis, on sentences of the first portion, the third analysis yielding a third set of confidence values measuring, for a given sentence including a concept pair, a likelihood that a concept pair exhibits an existing relation for concepts of the concept pair, wherein the third set of confidence values is based, in part on the second confidence values.

DETAILED DESCRIPTION

Constructing a knowledge graph, using a manual effort or automated computer processing using machine learning, each may have an associated cost. In the case of a manually constructed graph, the process can be very costly and time consuming, although the resulting knowledge graph may have a level of accuracy reflective of the expertise of the human operators who perform the manual construction. In the case of automated computer processing using machine learning, the processing time and cost may be lower than manual construction, but the results are more error-prone, and are less reliable and less useful.

Embodiments of the invention may use, among other techniques, aspects of bootstrapping and distant supervision to generate or modify a knowledge graph. This allows dealing with smaller sets of labeled data than is necessary for typical distant supervision, as well as removing the need for human intervention typically used in bootstrapping techniques to reduce noise. Therefore, embodiments of the invention may address disadvantages of both techniques along the spectrum of knowledge graph construction.

Figure 1:
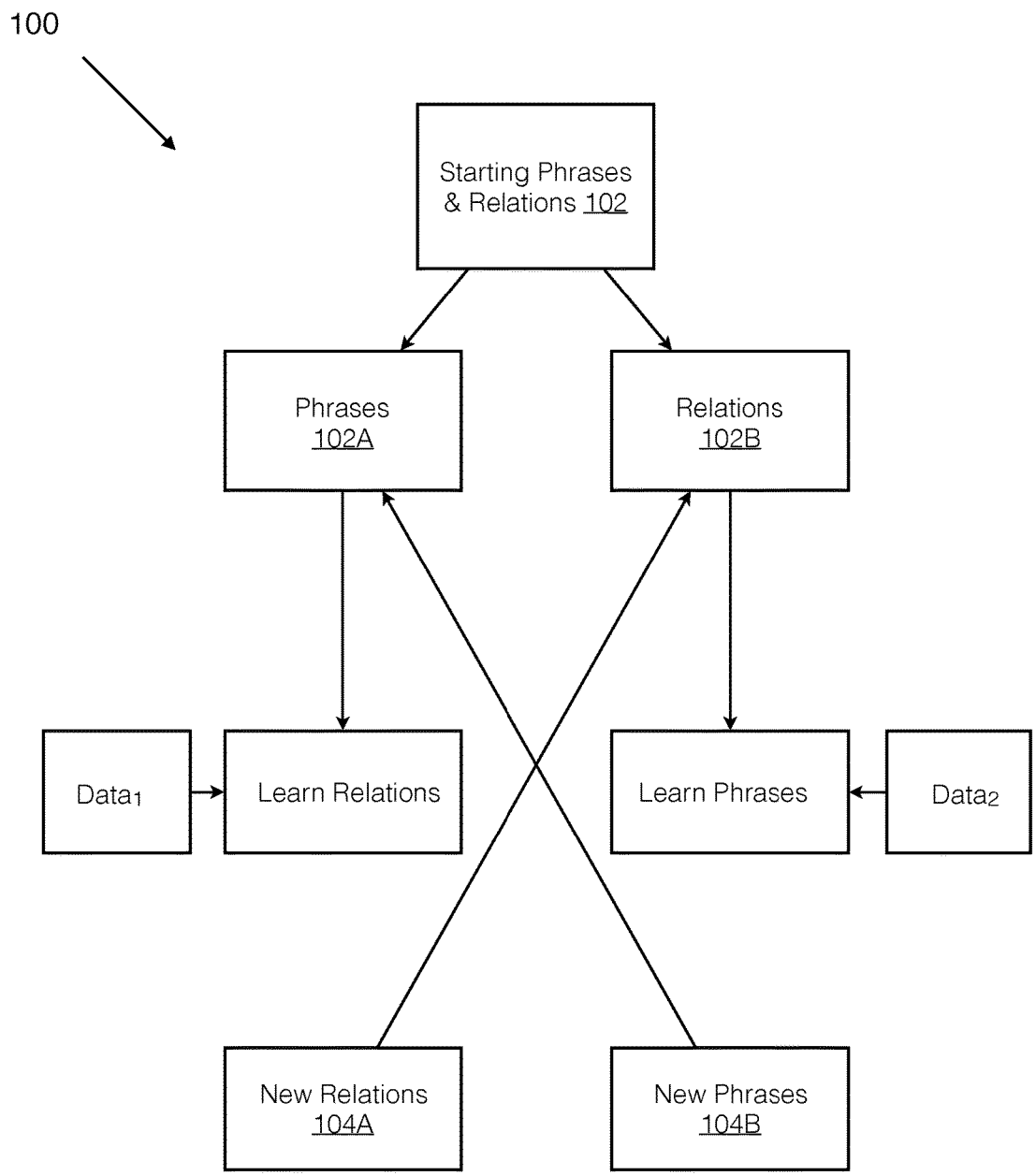
FIG. 1 is a diagram depicting a high-level overview of a method 100 for relation extraction by an NLP system, according to an embodiment of the invention.

FIG. 1 is a diagram depicting a high-level overview of a method 100 for relation extraction by an NLP system, according to an embodiment of the invention. Referring to FIG. 1, method 100 illustrates aspects of employing bootstrapping and distant supervision techniques to solve challenges in relation extraction that would otherwise be faced when using manual supervision or unsupervised relation extraction. Method 100 represents one embodiment of the invention, and therefore should not be viewed as limiting the invention; the invention is defined in the claims.

Generally, method 100 receives input text data comprising a set of sentences, and splits the data into two halves: $Data_1$ and $Data_2$. Using a starting set 102 of phrases and relations, method 100 analyzes $Data_1$ and $Data_2$ in conjunction with phrases 102A and relations 102B to generate new relations 104A and new phrases 104B. The analysis includes learning new relations 104A between phrases in $Data_1$, using existing phrases 102A; and learning new phrases 104B in $Data_2$, using existing relations 102B.

As used here, "existing" phrases or relations are those phrases and relations that have defined relationships in a given knowledge graph under consideration. In other words, method 100 uses information in the given knowledge graph to derive new insights from $Data_1$. Method 100 enhances the accuracy of this derived knowledge by analyzing $Data_2$ using the knowledge derived from $Data_1$. By the same token, method 100 enhances its analysis of $Data_1$ by applying the insights that method 100 derives from its analysis of $Data_2$. This process can be repeated iteratively to enhance the accuracy of the analysis, with each iteration adding more insights and providing higher reliability of its results.

Figure 2:
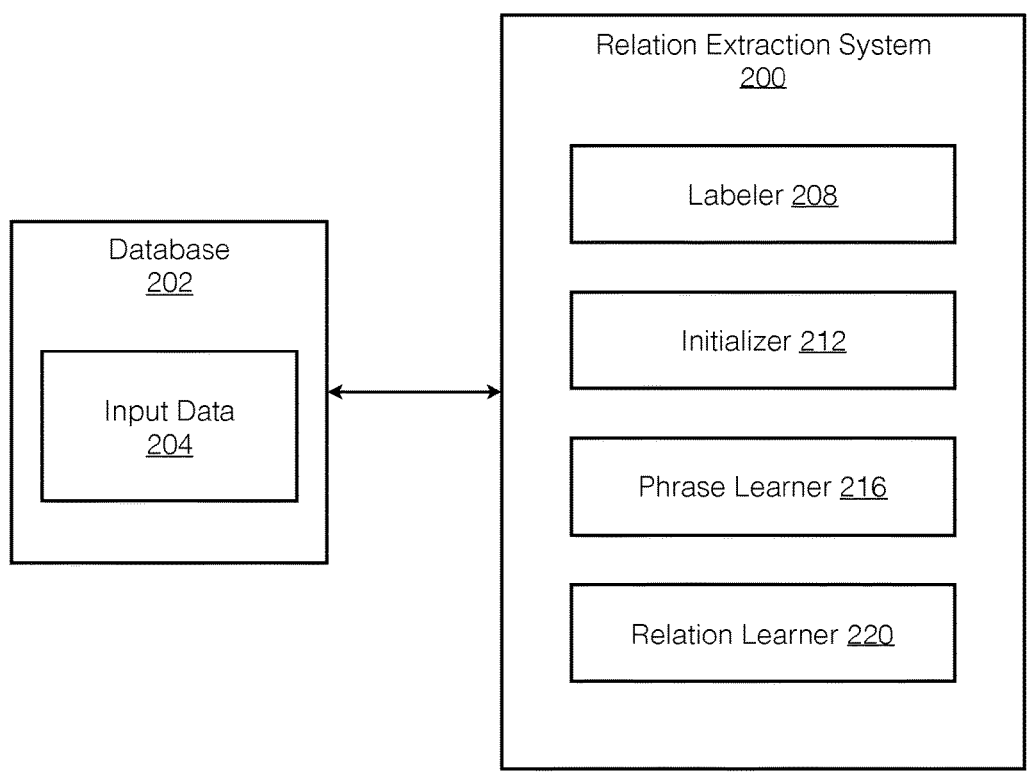
FIG. 2 is a functional block diagram of a relation extraction system 200, according to an embodiment of the invention.

FIG. 2 is a functional block diagram of a relation extraction system 200, according to an embodiment of the invention. Referring to FIG. 2, relation extraction system 200 may be embodied as a computing device, a component of a computing device, or a program having a set of modules or programming instructions embodied on a computing device. Additional details of the structure and implementation of relation extraction system 200 are discussed in connection with FIG. 5. Relation extraction system 200 may be operatively connected to a database 202 storing input data 204. Input data 204 may be in electronic text format, and may include a set of sentences; for example, 1,000 sentences in natural language form. Database 202 may be a physical or virtual database.

Relation extraction system 200 may include a labeler 208 component, an initializer 212 component, a phrase learner 216 component, and a relation learner 220 component. These components may be, in one embodiment, programming modules or instructions forming part of a single or distributed program, or a set of functions. In one embodiment, each may be provided as a service in a cloud computing platform. The grouping of the various functions of relation extraction system 200 as distinct components is to facilitate their description and a discussion of their features. Therefore, the particular organization of the components and their constituent functions is according to one embodiment, and other embodiments are possible.

Various aspects of relation extraction system 200 and its operations will be described below in connection with an illustrative example, hereinafter referred to as EXAMPLE 1, which includes illustrative data sets. The illustrative data sets of EXAMPLE 1 include a Mammal Knowledge Graph 300 (i.e., a knowledge graph that pertains to the knowledge domain of mammals), shown in FIG. 3, and an illustrative set of input data (a collection of sentences) referred to herein as $TextInput_1$. $TextInput_1$ is not shown in any Figure, but its constituent sentences are enumerated in text, as necessary, to assist in discussing EXAMPLE 1.

The Mammal Knowledge Graph 300 includes the following nodes: a root-level node (mammal) having two mid-level child nodes (canine) and (feline). The (canine) node may have two leaf-level child nodes (dog) and (fox), and the (feline) node may have a leaf-level child node (cat). The root-level node (mammal) may be defined as a category relative to all its child nodes, and as a concept relative to any parent node it may have (not shown); for example, where the Mammal Knowledge Graph 300 is modified to include nodes that are a level above the current root node. The mid-level child nodes (canine) and (feline) may be defined as concepts relative to the root node (mammal), and as categories relative to their respective leaf-level child nodes (dog), (fox), and (cat). The leaf-level child nodes may be defined as concepts relative to their parent nodes. In the event that the Mammal Knowledge Graph 300 is modified such that these leaf-level child nodes are associated with new child nodes of their own, they may be further defined as categories relative to the new child nodes.

General functions of each component of relation extraction system 200 will now be described, in accordance with an embodiment of the invention and in connection with EXAMPLE 1. Generally, relation extraction system 200 retrieves input data 204 from database 202. Relation extraction system 200 may perform various processing on input data 204 (for example, housekeeping tasks), and thereafter directs input data 204 to labeler 208. Referring to EXAMPLE 1, relation extraction system 200 may receive text that includes sentences discussing various animal species, including mammals. This use-case may be desirable where a desired objective is to improve the Mammals Knowledge Graph 300 (FIG. 3) by deriving insights and extracting relations from sentences in $TextInput_1$. For example, the sentences in $TextInput_1$ may be excerpts of a scientific research paper on inter-species mammalian behavior. This text may contain useful information about how mammals interact, and may be deemed a prime source for automated extraction of relation data for mammals, without the need for direct and manual supervision of the process by a human user. Additionally, using this text may be desirable because it may reduce the need to analyze larger data sets.

Labeler 208 generally receives input data 204, which may be in the form of text containing a set of sentences. Labeler 208 scans the text and generally performs concept identification and parsing of the text. In an embodiment, in addition to or in lieu of parsing, labeler 208 may perform the labeling using a matching function to a dictionary of frequent n-grams.

The concept identification process performed by labeler 208 may include comparing words or phrases (hereinafter, simply referred to as "words") in the text to words or phrases listed in a database of known concepts (this database may be an existing knowledge graph, such as a given knowledge graph under analysis). In an embodiment, this process may include (as an alternative, or an additional processing) analyzing the words using statistical techniques to perform approximate matches or to learn text-concept associations from large corpora.

Figure 3:
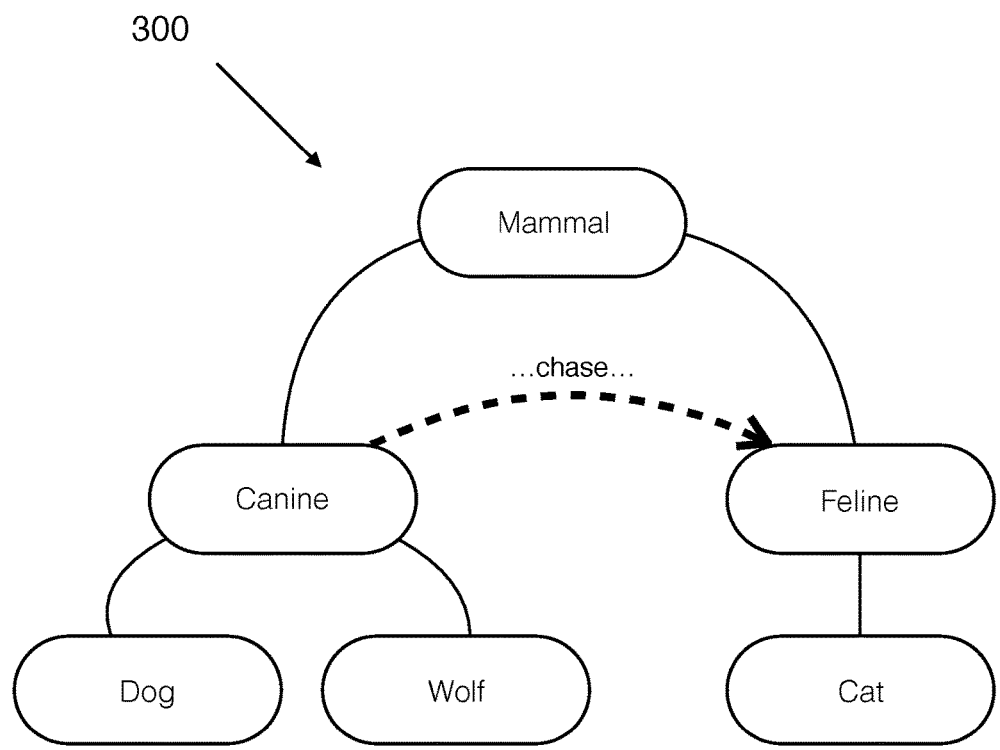
FIG. 3 is a diagram of an illustrative knowledge graph 300, according to an embodiment of the invention.

An output of this process may be an annotated form of the sentences, where words found to have been identified as concepts in the database of known concepts are annotated with concept identifiers, such as concept identification codes. Concept IDs may be defined as part of the data associated with the given knowledge graph. In an embodiment, the concept identification process may be performed by an annotator tool. Referring to EXAMPLE 1, labeler 208 compares sentences in TextInput$_1$ to nodes of the Mammal Knowledge Graph 300 (FIG. 3). If any of the words in the text match a word in the set {mammal, canine, feline, dog, fox, cat} (the comparisons may be based on canonical forms of each word), then that word is identified as a concept. Labeler 208 annotates that sentence with an ID associated with the concept. For example, if a sentence in TextInput$_1$ reads "dogs chase cats", then "dogs" and "cats" are identified as two concepts in that sentence, and the text is annotated such that each of the words "dogs" and "cats" is annotated with an associated concept ID.

The parsing process performed by labeler 208 identifies syntactic and lexical features of the text. Lexical features may be defined as occurrences of single words that are relevant to the presence or absence of a relation. Syntactic features may be defined as occurrences of phrases (words joined as a syntactic unit, like a verb-phrase) that are relevant to the presence or absence of a relation. An output of this process may include a parse tree (for example, a parse tree for each sentence) together with a list of detected lexical and syntactic features, where features may be given their canonical and mention forms. In an embodiment, the parsing process may be performed by a parser tool. In the example sentence "smoking has been linked to cancer", the lexical words may be, for example, {has, been, linked, to}. A syntactic feature may be a phrase chunk, "has been linked to". The concept pairs may be, for example, {smoking, cancer}, and {cancer, smoking}.

To summarize the output of labeler 208; labeler 208 generates an output including the annotated text and its associated lexical and syntactic features. For ease of reference, this output is referred to herein as the "Data." Relation extraction system 200 provides this Data to initializer 212. Referring to EXAMPLE 1, the Data includes a modified form of TextInput$_1$, in that it includes the text in TextInput$_1$ plus the annotations, the parse trees, the lexical and syntactic features, and other information that labeler 208 generates based on TextInput$_1$.

Initializer 212 splits the Data into at least two parts: Data$_1$ and Data$_2$. In an embodiment, Data$_1$ and Data$_2$ are equal or near equal halves, as measured by the number of sentences in each data set, and include in-order data. For example, where the Data includes 1,000 sentences, Data$_1$ may include the first 500 sentences, and Data$_2$ may include the second 500 sentences. However, other splits are possible, without diverging from the spirit and scope of the invention. For example, the split may not be half-and-half, and the sentences in each set need not appear in consecutive order. Among the factors that may be considered in determining how to split the Data is the overall Data size and the size of individual sentences. As a further example, the sentences may be evaluated as to how useful or reliable they are expected to be to the overall processing objectives of relation extraction system 200; the sentences may be scored, and the Data may be split, in such a way as to create two data sets having a balanced utility or reliability score. For example, sentences that have only one identified concept may not be very useful, and may be assigned a low score (or may be filtered out all-together). In another example, sentences having too many concepts (e.g., a number of concepts above a threshold) may be filtered out, based on an assumption that such sentences may be too complicated to yield reliable results (this assumption is not necessarily true; the example merely illustrates how the contents of the Data may be filtered and how the split may be controlled and customized).

According to an embodiment, initializer 212 performs initialization operations on Data$_1$. These operations may include a category-based initialization, or a combination of a category-based initialization and a concept-based initialization.

Category-based initialization may include: identifying concept pairs in one or more sentences in Data$_1$; for a given identified concept pair, identifying existing relation(s) between those concepts based on existing relations of their categories; and, for a given sentence that includes the identified concept pair, determining a confidence score that represents a tentative measure of how strongly the given sentence supports the existing relation(s). Each of these components of category-based initialization will now be described in greater detail.

The process of identifying concept pairs in each sentence in Data$_1$ (which may be a part of category-based initialization) includes identifying, for each sentence under consideration, the concepts identified in that sentence (not all sentences in Data$_1$ need to be considered, and not all concept pairs need to be identified). The identification may be performed using the concept identifiers with which labeler 208 annotates the sentence in Data$_1$. Each identified concept may be paired with each additional concept identified. In an embodiment, fewer pairings may be considered. Pairings may be limited to unique sets, although this is not necessarily the case. In one example, a sentence having two identified concepts may yield one concept pair. A sentence having three identified concepts may yield two unique concept pairs. A sentence having two identified concepts with each concept appearing twice in the sentence may yield one concept pair; or it may have two concept pairs where, for example, the sentence recites the first concept followed by a relation followed by the second concept, and also recites the second concept followed by a relation followed by the first concept (such that for each mention of the concept pair, the order is different). Other pairings are possible. Referring to EXAMPLE 1 and TextInput$_1$, where a sentence is "dogs chase cats", {dog, cat} is identified as a concept pair.

The process of identifying existing relation(s) between two concepts (this process may be a further part of category-based initialization), for a given identified concept pair, includes identifying relations associated with two categories, where each of the two categories is associated with one of the two concepts in the concept pair. A category and its association with a concept is defined based on a knowledge graph. That is, each concept in the concept pair is (according to an embodiment) a node in a knowledge graph, and the node has a direct parent node, and may have additional indirect parent nodes. The direct parent node, or an indirect parent node(s), or a combination of them may each be identified as a category (that is, functions involving such categories may be repeated for one, some, or all such identified categories). In an embodiment, the relations may be structured as a set of "is-a" links that connect categories and their concepts. In an embodiment, the relations need not be in a hierarchical structure. Referring to EXAMPLE 1 and the identified concept pair {dogs, cats}, the associated categories may be {canines, felines}. The Mammals Knowledge Graph 300 (FIG. 3) may have an existing relation defined for canines and felines: {chase}. In other words, according to the Mammals Knowledge Graph 300, the statement canines chase felines defines an existing relation between canines and felines.

To summarize the process of identifying existing relations; where a concept pair is identified, initializer 212 identifies the category of each concept in the concept pair, and determines whether the two categories in the pair have an associated relation to one another. If more than one category is associated with a given concept(s), then the overall evaluation may be performed for one, some, or all associated categories, to identify associated relations. These associated relations may also be referred to as "known relations" or "existing relations". Describing a relation as "known" or "existing" does not necessarily indicate that the relation is true between the two categories. Whether a known relation (or any other relation under evaluation) is a true relation may be measured, in an embodiment, using a confidence score; for example, a value between 0-1 (or a percentage, or another value scale). This approach may be particularly useful since for many categories or concept pairs, it may be the case that no relation holds true for them all the time, and therefore holding that relation to be true all the time would be incorrect. On the flip side of this scenario, it may be that the relation holds true at least sometimes, and therefore holding that the relation is false all the time would be incorrect. Therefore, in some instances, it may be preferable to describe the relation in terms of a confidence level or confidence score, rather than a binary true or false value. Referring to EXAMPLE 1 and the relation chase between canines and felines, this relation is not necessarily true for all canines and felines. This example, among others, signifies one utility of embodiments of the invention, whereby an existing relation is evaluated and scored on a scale, rather than according to a binary true or false determination.

The process of determining a confidence score for a given sentence that includes the identified concept pair (this process may be a further part of category-based initialization), where the confidence score represents a tentative measure of how strongly the given sentence supports the existing relation(s) of the concept pair's categories, may be as follows, according to an embodiment of the invention. The process may assume that if two concepts occur in the same sentence, they are likely to be expressing some relationship to one another. In an embodiment, determining the likelihood that this "some relationship" is the same relationship as the existing relationship, identified as being associated with their corresponding categories, is calculated as being inversely proportional to the number of paths between the two categories of the concepts in the category knowledge graph of maximum distance (2). The relationship may be defined (over multiple sentences), as in Formula (1), $$P_{Cat}(i_1, i_2) = \sum_{|r_c| \le 2} \frac{1}{|r_c|} \quad (1)$$

where $P_{Cat}$ is the likelihood of a relation for a concept pair i under consideration due to the concepts' categories, $i_1$ is a first concept in the concept pair, $i_2$ is a second concept in the concept pair, and $r_c$ is a path (a set of consecutive edges) denoting a relation between two categories in the graph, and $|r_c|$ is the length of the path (depending on the embodiment, either 1 or 2). Referring to EXAMPLE 1, and assuming the sentence under consideration to be "dogs run after cats", the concept pair being {dogs, cats}, the categories being {canines, felines}, and the known relation being {chase}, where {chase} is one of three known relations, then the likelihood that the sentence "dogs run after cats" is an example of the known relation {chase} is ⅓. The process may be repeated for all, some, or none of the remaining two known relations for {canines, felines}.

According to an embodiment of the invention, initializer 212 may enhance its category-based initialization by performing additional processing that includes a pointwise mutual information (PMI) analysis. The PMI analysis may help determine, for a given pair of categories considered in the analysis performed in connection with Formula (1), above, whether the two categories are even related at all or to what extent they are related. Recall that in performing the analysis under Formula (1), initializer 212 relies on known relationships between categories under consideration. However, the fact of the two categories having a known relationship may merely be an assumption whose veracity is under test, and it may actually not be true; or it may not be true to as high a level of confidence as may have been assumed. The PMI analysis may be performed according to Formula (2), $$M(i_1, i_2) = \frac{2 * PMI(i_1, i_2)}{\sum_{j_2} PMI(i_1, j_2) + \sum_{j_1} PMI(j_1, i_2)} \quad (2)$$

where $M(i_1, i_2)$ is a factor denoting contributions from the PMI of a concept pair i under consideration, $i_1$ is a first concept in the concept pair, $i_2$ is a second concept in the concept pair, $j_1$ is any concept, and $j_2$ is any concept, and where for each of the three PMI expressions, PMI is defined as in Formula (2a), $$PMI(x, y) = \log \frac{p(x, y)}{p(x)(py)} = \log \frac{p(x | y)}{p(x)} = \log \frac{p(y | x)}{p(y)} \quad (2a)$$

Generally, Formula (2) measures the chance of the two concepts (which are associated with the two categories under consideration) co-occurring in the same sentence over the chance of the two concepts occurring independently. The chance of co-occurrences of the two concerned concepts is compared to a sum of the chances of each of the two concepts co-occurring with other concepts in the graph.

The results of Formula (2) may be weighted such that more weight is given to those pairs which have a higher co-occurrence. The weighting may be done as in Formula (3), $$S_{i,0} = \frac{1}{P_{Cat}(i_1, i_2)} * M(i_1, i_2) * \frac{n_i}{n_i + k} \quad (3)$$

where $S_{i,0}$ is a score of confidence at initialization for the concept pair i, $P_{Cat}(i_1, i_2)$ is the output of Formula (1), $M(i_1, i_2)$ is the output of Formula (2), $n_i$ is the frequency (i.e., number of times) that a concept pair (i) appears, and k is a tuning parameter for increasing or decreasing the weight of $n_t$ on the score. In practice, experimental data has shown k=2 to be a reasonable value.

Recall that according to embodiments of the invention, initializer 212 may perform exclusively a category-based initialization, or a category-based and a concept-based initialization. Moving on to the latter of these two embodiments, initializer 212 performs initialization operations on Data$_1$ using a combination of a category-based initialization and a concept-based initialization. One benefit of performing concept-based initialization may be to augment the confidence scores calculated using category-based initialization, by using information about known relations of two concepts in a given concept pair. In this case, the category-based initialization may be performed as described above. Concept-based initialization may be performed as follows.

Concept-based initialization may be performed in a manner similar to that of category-based initialization, except that the known relations under consideration are those connecting the concepts in the pair, rather than those connecting their respective categories. Accordingly, the process of determining a confidence score for a given sentence that includes the identified concept pair (this process may be a further part of concept-based initialization), where the confidence score represents a tentative measure of how strongly the given sentence supports the existing relation(s) between the concept pair, may be as described in Formula (4), according to an embodiment of the invention.

$$P_{Concept}(i_1, i_2) = \sum_{|r_t| \le 2} \frac{1}{|r_t|} \qquad (4)$$

where $P_{Concept}$ is the likelihood of a relation for a concept pair i under consideration, $i_1$ is a first concept in the concept pair, $i_2$ is a second concept in the concept pair, and $r_t$ is a path (a set of consecutive edges) denoting a relation between two concepts in the graph. Referring to EXAMPLE 1, a known relation between dog and cat may be defined fear; as in, cats fear dogs. This known relation may be defined in the Mammal Knowledge Graph 300 (FIG. 3). A given sentence in InputText$_1$ that includes cats and dogs may be evaluated using this approach to determine how that sentence impacts the likelihood (as measured by a confidence score) that the relation under consideration holds true for cats and dogs. The process is similar to that used for category-based initialization.

The approach used in Formula (4) assumes that the reference knowledge graph includes the known relation between the two concepts in the concept pair under consideration. This may be a reasonable assumption where the concept pair is common, but for rare pairings, the results may be improved by calculating this path confound term from the category knowledge graph instead. In order to capture this switch, a logistic function may be used based on the number of times ($n_t$) that the concept pair is found in Data$_1$, as shown in Formula (5), $$LW(i) = \frac{1}{1 + e^{-n_i * k' + k * k'}} \qquad (5)$$

where LW is a logistic weight, i is the concept pair under consideration, n is the number of times that the concept pair occurs in Data1, k and k' are tuning parameters. In principle, k is a parameter for determining how much to trust concept pairs based upon how many times it is found in the data; whereas, k' is a parameter for determining how much to trust that a known knowledge base contains all or most of the relevant concept links between a concept pair based upon how many times that pair is found in the data. An embodiment could vary k and k' based upon the size of the data and the expected completeness of the concept knowledge graph.

Using the confidences calculated for both the category-based initialization and the concept-based initialization, a combined updated confidence score may be calculated according to Formula (6), $$S_{i,0} = (1 - LW(i)) * \frac{1}{P_{Cat}(i_1, i_2)} + LW(i) * \frac{1}{P_{Concept}(i_1, i_2)} \qquad (6)$$

where $S_{i,0}$ is updated to include results of both the category-based initialization and the concept-based initialization. The combined score represents an initial concept-based confidence that a sentence S reciting a concept pair i at an initialization calculation (0) is indicative of the existing relation under evaluation.

To summarize some the functions that initializer 212 can perform; initializer 212 may operate on Data$_1$ to evaluate one, some, or all sentences therein. For each sentence that is selected for evaluation, initializer 212 identifies one, some, or all concept pairs therein. For each concept pair selected for further evaluation, initializer 212 may further consider one, some, or all known relations between the categories of that concept pair. For each concept pair and a category relation selected for further analysis, initializer 212 may calculate a category-based score, which represents the likelihood that the sentence is evidence of the category-based relation. Additionally, for each concept pair selected for further evaluation, initializer 212 may further consider one, some, or all known relations between the concepts in the concept pair (as opposed to relations between the concepts' respective categories). For each concept pair and a concept relation selected for further analysis, initializer 212 may calculate a concept-based score, which represents the likelihood that the sentence is evidence of the concept-based relation. Initializer 212 may combine the category-based initialization score and the concept-based initialization score to provide a combined initialization score (there may be many scores).

Initializer 212 may provide the scores it generates to other components in relation extraction system 200 for further analysis. For example, these scores may be used in further processes to bootstrap learning of syntactic and lexical confidences, as described below.

According to an embodiment of the invention, phrase learner 216 may receive the initial scores, derived from Data$_1$ by initializer 212, and use them in analyzing Data$_2$ to determine, for a given sentence under consideration, the likelihood that a given syntactic or lexical feature signifies a relation of interest. Accordingly, phrase learner 216 scans Data$_2$ and identifies concepts, concept pairs, and relations that also occurred in Data$_1$ and were the basis of scoring operations by initializer 212; in other words, phrase learner 216 identifies, in Data$_2$, occurrences of the scored contents of Data$_1$. Among this data are the lexical and syntactic features that are identified by labeler 208.

In an embodiment, all or a large set of concept pairs belonging to a viable category (i.e., a category having a scored known relation in Data$_1$) is considered, since they all have an associated confidence value that can be used in the analysis. Contrast this with typical distant supervision techniques where not all pairs would be considered, because there is insufficient reference information. Phrase Learner 216 may operate according to Formula (7), $$S_{f_i,t} = \sum_{j \in R_f} S_{j,t} \qquad (7)$$

where $S_{f_i,t}$ represents the confidence at iteration t that a specific sentence (f) containing the phrase (i) expresses the desired relation, f is a sentence under consideration, i is an index identifying a specific phrase, t is an index identifying the iteration, $R_f$ is the set of concept pairs in sentence f which could be example of the relation, j is an index identifying a concept pair in the set $R_f$, and $S_{j,t}$ is the confidence on the relation given by the concept pair j at iteration t.

Phrase learner 216 may adjust the scores from Formula (7) so as not to give undue weight to sentences with small confidence features. At the same time, it may be desirable for phrase learner 216 not to discount instances of medium confidences. Therefore, maximum confidences may not be desirable under some circumstances. To balance these considerations, phrase learner 216 may employ a logistic weighting scheme, as the integral of the logistic function expressed below as Formula (8), $$\alpha_{f,j} = \int_{x_{j+1}}^{x_j} \frac{2}{1 + e^{-k'*x+\frac{k'}{2}}} \qquad (8)$$

where $a_{f,j}$ is a weight for sentence f and concept pair j, $x_j$ is the set of coordinates of each respective entity pair when ordered by weight along the number line from 1 to 0 spaced out according to their respective weights such that the area used is dominated by the large weights if they are proportionally larger than the confidence in the other concept pairs, and where k' is a tuning parameter. In one embodiment, k' as used in Formula (8) may be the same k' value as used in Formula (5).

This, in turn, can be used to update Formula (7), which may be styled as Formula (7a), $$S_{f_i,t} = \sum_{j \in R_f} S_{j,t}, \alpha_{f,j} \qquad (7a)$$

Phrase learner 216 may use these lexical and syntactic mention confidences to calculate confidences for lexical and syntactic types; i.e., the confidence that when a phrase or word appears in a given sentence, the given sentence expresses a given relation under consideration. According to an embodiment, this may be accomplished by averaging the confidence scores of all the mentions of the same type. This confidence score can further be modulated by the number of occurrences of the phrase or word, given by Formula (9), as provided below.

$$S_{i,t} = \frac{\sum_{j \in R_f} S_{j,t}}{n_i} * \frac{n_i}{n_i + k} \qquad (9)$$

Phrase learner 216 provides its output to relation learner 220, and relation learner 220 uses this information as input, together with phrases identified in Data₁. Relation learner 220 uses this information to determine relation mention confidences, i.e., a confidence that a specific sentence containing a given concept pair, at a given iteration, expresses a desired relation. This can be summed as in Formula (10), $$S_{f_i,t+1} = \sum_{j \in R_f} S_{j,t}, \alpha_{f,j} \qquad (10)$$

where $S_{f_i,t+1}$ is the confidence for sentence f containing concept pair i, at iteration t+1. Here $R_f$ is a set of lexical or syntactic features in f, $S_{j,t}$ is the confidence in the type j at iteration t, and $a_{f,j}$ is the logistic integral weight for sentence f and lexical or syntactic feature j.

Put another way, Formula (10) determines the confidence at iteration t+1 that mention $f_i$ of concept pair i expresses the relation being discovered. And, also as above, calculating the concept pair type confidences may be done, in an embodiment, by averaging the confidences of the mentions, as adjusted based on the total number of times the concept pair has been encountered. This may be referred to as a relation type confidence $S_i$, representing a confidence that when a concept pair i is present in a sentence, the desired relation is being expressed, where $n_i$ is the total number of mentions of concept pair i, as in Formula (11).

$$S_{i,t+1} = \sum_{f_i,t} \frac{S_{f_i,t}}{n_i} * \frac{n_i}{n_i + k} \qquad (11)$$

The above processes provide a new set of confidences on concept pair types. Previously determined confidence scores in words/phrases may be updated with these results. However, under some circumstances, this may introduce unacceptable noise into the data. This may be countered by, for example, adding only the top x % of concept pairs, as sorted by confidence scores, into the reference concept knowledge graph.

In deciding what value of z to use, in one embodiment, the following process may be used. A notion of signal to noise, call it Information Yield, may be adapted, as $$\frac{\text{hits}}{\text{expected hits}},$$

and Formula (11).

$$Y(z, R_{restricted}) = \frac{acc(R_{discovered}, R_{restricted}, Z)}{z} \qquad (12)$$

where $R_{restricted}$ is a withheld blind training set. Given this as a metric, a value for z may be selected such that $$z = \underset{z}{\text{argmax}}(Y(z, R_{restricted})).$$

Thereafter, x could be set to ⅓ z and of the new pairs in the top x % of the discovered relations may be added to the reference knowledge graph. With the addition of new edges, the concept knowledge graph is again used to initialize concept pair type probabilities and the algorithm may iterate as long as desired.

Figure 4:
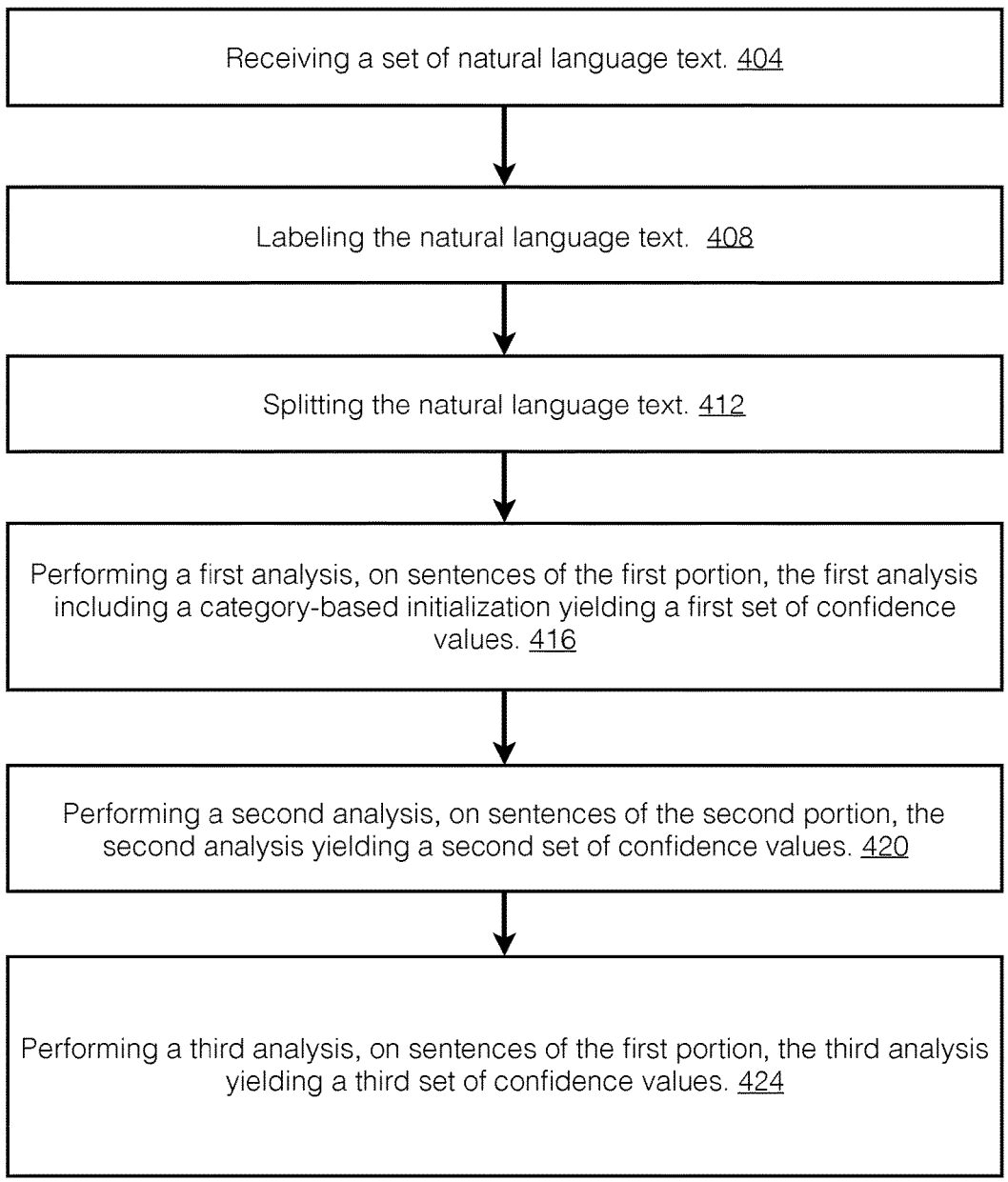
FIG. 4 is a flowchart of a method 400, according to an embodiment of the invention.

FIG. 4 is a flowchart of a computer implemented method 400 for knowledge graph processing, according to an embodiment of the invention. The method may include as a set of programming instructions executable by a processor of a computer, and may be embodied on a tangible storage device of a computer. For example, method 400 may be a computing program as described in connection with FIG. 5.

Generally, method 400 may be a method employed in relation extraction system 200 (FIG. 2), and may be performed by the various modules thereof, to receive input data 204 on stored on database 202, detailed at length in connection with FIGS. 2 and 3.

Referring now to FIGS. 2 and 4, relation extraction system 200 receives (step 404) a natural language text including sentences, from an input source. For example, labeler 208 receives input data 204 from database 202.

Relation extraction system 200 labels (step 408) the natural language text. The labeling includes identifying concepts in the natural language text and parsing the natural language text. For example, labeler 208 compares words and phrases of the natural language text to elements of Knowledge Graph 300. Matching words are considered concepts, and are annotated with concept IDs. Labeler 208 also parses the natural language text to identify its lexical and syntactic features.

Relation extraction system 200 splits (step 412) the natural language text into at least a first portion and a second portion. For example, initializer 212 splits the natural language text into $Data_1$ and $Data_2$.

Relation extraction system 200 performing a first analysis (step 416), on sentences of the first portion, the first analysis comprising a category-based initialization on identified concepts of the first portion of the natural language text, the category-based initialization yielding a first set of confidence values measuring, for a given sentence including a concept pair, a likelihood that the sentence is an instance of an existing relation of the concepts in the concept pair. For example, initializer 212 determines initial confidence scores using $Data_1$ that can be used to bootstrap additional processing in other steps using $Data_2$.

Relation extraction system 200 performs a second analysis (step 420), on sentences of the second portion, the second analysis yielding a second set of confidence values measuring, for a given sentence including a concept pair, a likelihood that a phrase connecting concepts in the concept pair is an instance of an existing relation between the concepts in the concept pair, wherein the second set of confidence values is based, in part, on the first confidence values. For example, phrase learner 216 uses the output of initializer 212, and $Data_2$, to determine confidence scores for phrases expressing relations.

Relation extraction system 200 performs a third analysis (step 424), on sentences of the first portion, the third analysis yielding a third set of confidence values measuring, for a given sentence including a concept pair, a likelihood that a concept pair exhibits an existing relation for concepts of the concept pair, wherein the third set of confidence values is based, in part on the second confidence values. For example, relation learner 220 uses the output of phrase learner 216, and $Data_1$, to determine confidence scores for relations expressed in $Data_1$.

Method 400 may also perform additional functions, not explicitly shown as separate steps in FIG. 4, according to various embodiments of the invention. According to an embodiment of the invention, method 400 iteratively processes sentences of the first portion and sentences of the second portion. The processing includes updating the first, second, and third sets of confidence values based on the processing.

According to a further embodiment, method 400 identifies, in a given sentence in the first portion of the natural language text, at least one concept pair. The method further identifies an existing relation between respective categories of each concept in the concept pair. Finally, the method determines a likelihood that the given sentence exhibits the known relation. According to a related embodiment, category-based initialization includes performing a pointwise mutual information (PMI) analysis of the at least one concept pair.

According to a further embodiment, method 400 also performs a concept-based initialization on the identified concepts of the first portion. This process identifies an existing relation between the concepts in the concept pair, and determines a likelihood that the given sentence exhibits the known relation.

According to a further embodiment, the labeling process in method 400 includes annotating concepts with identification codes.

According to a further embodiment, method 400 identifies concepts by comparing words of the natural language texts to concepts in a knowledge graph, and identifying matching words in the natural language text as concepts.

According to a further embodiment, method 400 splits the natural language text by adding an equal number of sentences to the first portion and to the second portion.

According to a further embodiment, method 400 splits the natural language text by adding each of two consecutively occurring sentences in the natural language text to a different one of the first portion and the second portion.

According to a further embodiment, method 400 splits the natural language text by filtering the sentences in the natural language text to exclude any sentence having more than a threshold number of identified concepts.

Figure 5:
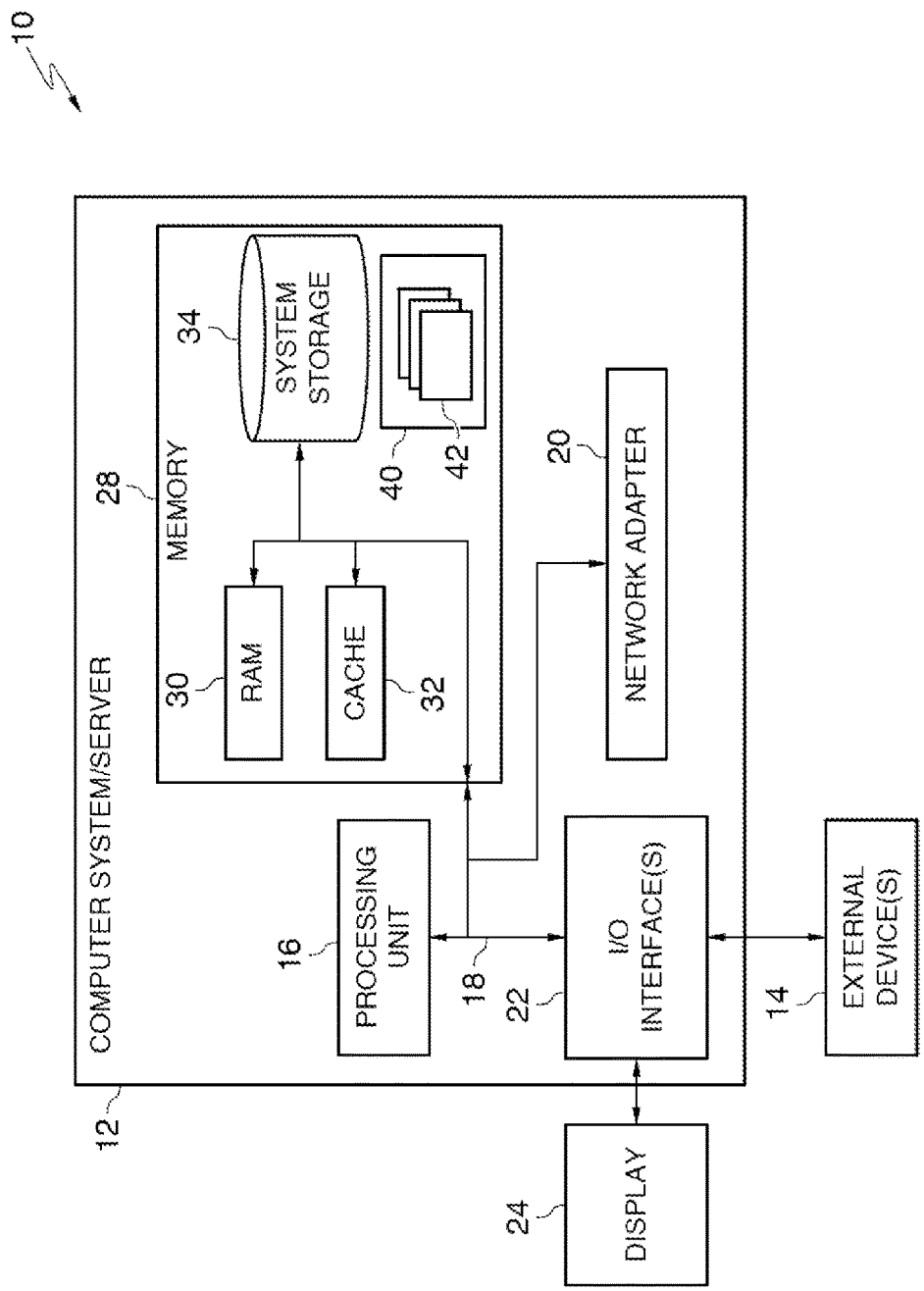
FIG. 5 is a block diagram of an illustrative computing node, according to an embodiment of the invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
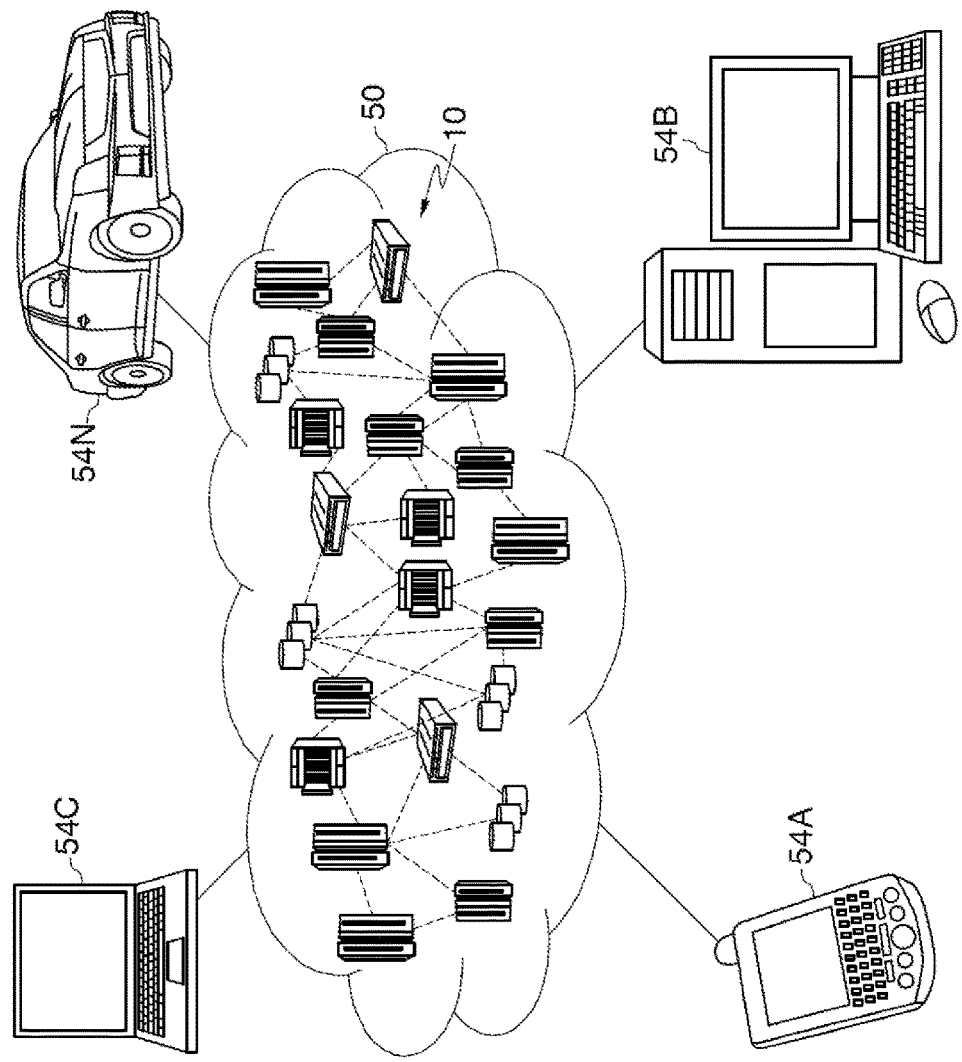
FIG. 6 is a diagram of an illustrative cloud computing environment, according to an embodiment of the invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 50 can communicate with any type of computerized device over any type of network and/or network addressable connection (e.g., using a web browser).

Figure 7:
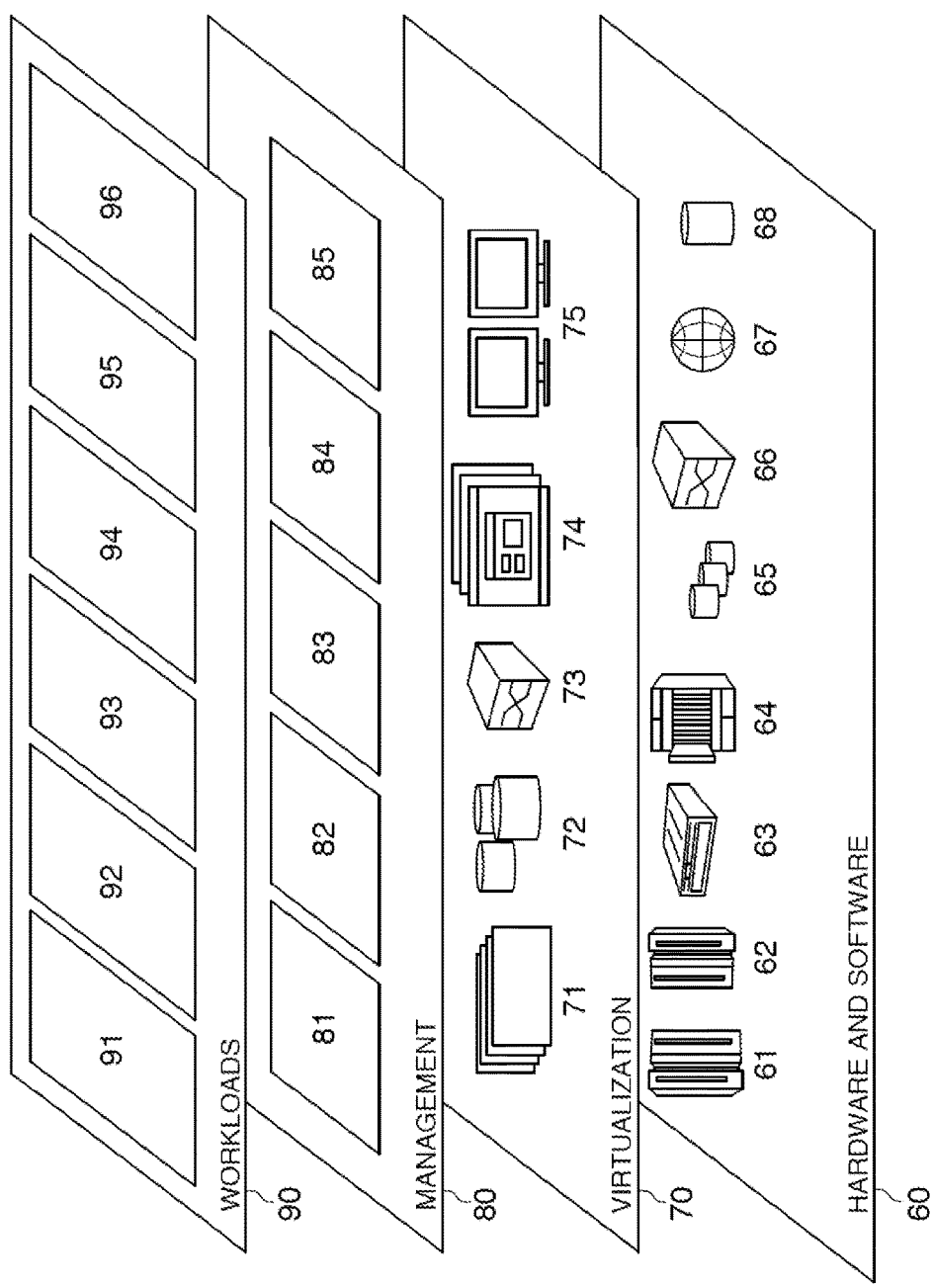
FIG. 7 is a diagram of functional layers of the cloud computing environment of FIG. 6, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1-4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for processing an electronically stored knowledge graph comprising:

receiving a set of natural language text;

labeling the natural language text, the labeling comprising identifying concepts in the natural language text and parsing the natural language text;

splitting the natural language text into at least a first portion and a second portion;

performing a first analysis, on sentences of the first portion, the first analysis comprising a category-based initialization on identified concepts of the first portion of the natural language text, the category-based initialization yielding a first set of confidence values measuring, for a given sentence including a concept pair, a likelihood that the sentence is an instance of an existing relation of the concepts in the concept pair, wherein the category based initialization comprises identifying, in a given sentence in the first portion of the natural language text, at least one concept pair;

identifying an existing relation between respective categories of each concept in the concept pair;

and determining a likelihood that the given sentence exhibits the known relation;

performing a second analysis, on sentences of the second portion, the second analysis yielding a second set of confidence values measuring, for a given sentence including a concept pair, a likelihood that a phrase connecting concepts in the concept pair is an instance of an existing relation between the concepts in the concept pair, wherein the second set of confidence values is based, in part, on the first confidence values;

performing a third analysis, on sentences of the first portion, the third analysis yielding a third set of confidence values measuring, for a given sentence including a concept pair, a likelihood that a concept pair exhibits an existing relation for concepts of the concept pair, wherein the third set of confidence values is based, in part on the second confidence values;

iteratively processing sentences of the first portion and sentences of the second portion, the processing comprising updating the first, second, and third sets of confidence values based on the processing;

updating the reference knowledge graph to include relations between concepts whose corresponding confidence scores exceed a threshold value; and using the updated reference knowledge graph in an analysis of additional natural language text.

* * * * *